No. 649,738. Patented May 15, 1900.
A. MAXWELL.
HOOF TRIMMER.
(Application filed Dec. 14, 1899.)
(No Model.)
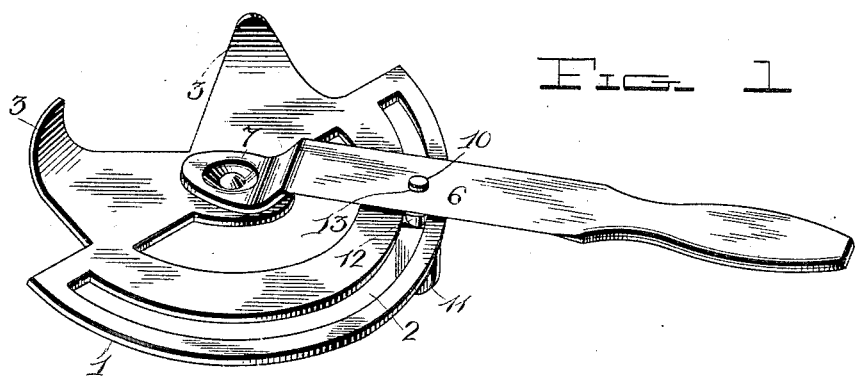
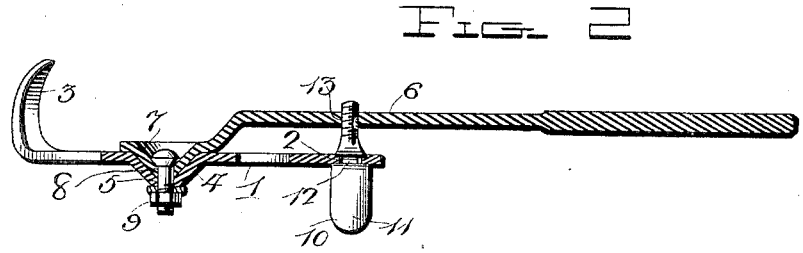
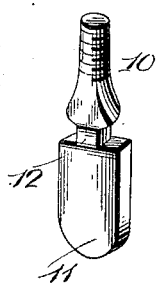
Inventor
Albert Maxwell,
by H. B. Willson & Co.
Attorneys
Witnesses

UNITED STATES PATENT OFFICE.

ALBERT MAXWELL, OF WITTS SPRINGS, ARKANSAS.

HOOF-TRIMMER.

SPECIFICATION forming part of Letters Patent No. 649,738, dated May 15, 1900.

Application filed December 14, 1899. Serial No. 740,301. (No model.)

*To all whom it may concern:*

Be it known that I, ALBERT MAXWELL, a citizen of the United States, residing at Witts Springs, in the county of Searcy and State of Arkansas, have invented certain new and useful Improvements in Hoof-Trimmers; and I do declare the following to be a full, clear, and exact description of the invention, such as will enable others skilled in the art to which it appertains to make and use the same.

The invention relates to hoof-trimmers—devices to be used for trimming down the hoofs of animals prior to shoeing them.

The object of the invention is to provide a hoof-trimmer which shall be simple of construction, durable in use, and comparatively inexpensive of production, and by the employment of which a hoof may be smoothly and quickly trimmed.

To this end the invention consists in certain features of construction and combination of parts, which will be hereinafter fully described and claimed.

In the accompanying drawings, Figure 1 is a perspective view of my improved hoof-trimmer. Fig. 2 is a longitudinal sectional view. Fig. 3 is a detail perspective view of the adjusting-screw.

In the drawings the same reference characters indicate the same parts of the invention.

1 denotes the base of the plate, formed with a segmental curved slot 2 at one edge and with hoof-engaging prongs 3 at its opposite edge. The central portion of the plate is formed with a concavity 4, having an aperture 5.

6 denotes a cutting-blade, the inner end of which is formed with a conical boss 7 to engage the concavity 4 and an alined aperture 8. A short bolt is inserted through the aperture of the plate and the cutting-blade and is provided with a nut 9.

10 denotes an adjusting-screw having a head 11 of a thickness to permit of its insertion through the curved slot and of such breadth that after it has been inserted through said slot and given a quarter of a turn it will be prevented from being withdrawn from said slot. This screw is provided with a shank portion 12, which moves in the slot as the cutting-blade is operated.

13 denotes a screw-threaded aperture formed in the cutting-blade to receive the threads of the screw.

In operation the device is applied to the hoof to be trimmed in the usual manner. The cutting-blade, which is provided at one end with a handle, is moved to one side, thus shearing off a portion of the hoof. A movement of the cutting-blade in the opposite direction will shear off the other side of the hoof. The depth of the cut is regulated by the screw 10. If it be desired to cut off thick slices, the screw may be rotated to elevate the blade a greater distance from the plate, and if it be desired to cut off thin slices the screw is worked to draw the blade closer to the plate. In adjusting the device care should be taken to have the head of the set-screw extend breadthwise across the curved slot, so that it will not be accidentally pulled through said slot.

From the foregoing description, taken in connection with the accompanying drawings, the construction, operation, and advantages of my improved hoof-trimmer will be readily apparent without requiring an extended explanation.

It will be seen that the device is simple of construction, that said construction permits of its manufacture at small cost, and that it is exceedingly well adapted for the purpose for which it is designed, and it will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

A hoof-trimmer comprising, in combination, a base-plate having attaching-claws at one side and a segmental curved slot at the other side, a cutting-blade pivoted to said base-plate, and a set-screw to engage with said cutting-blade and having a head that projects through said slot and which is of greater breadth than said slot and is provided with a shank, substantially as and for the purpose set forth.

In testimony whereof I have hereunto set my hand in presence of two subscribing witnesses.

ALBERT MAXWELL.

Witnesses:
ELLA ROBINSON,
LIZZIE SHAVER.